United States Patent Office 3,594,193
Patented July 20, 1971

3,594,193
POWDERED ICE CREAM MIX
Abraham R. Mishkin, Marysville, Donald E. Yingst, Columbus, and Joseph J. Peters, Marysville, Ohio, assignors to Société d'Assistance Technique Pour Produits Nestlé S.A.
No Drawing. Filed May 20, 1968, Ser. No. 730,625
Int. Cl. A23g 5/00
U.S. Cl. 99—136      4 Claims

ABSTRACT OF THE DISCLOSURE

Preparing a powdered non-dairy ice cream mix by forming a premix of fat, sugar, corn syrup, sodium caseinate, and emulsifier homogenizing and spray drying the premix and subsequently blending the premix with additional sweetener, fat, emulsifier and a flavoring. The emulsifier employed is a combination of sorbitan tristearate and sorbitan monooleate.

---

This invention is concerned with a non-dairy ice cream product and a process for its production.

Ice cream is essentially a frozen aqueous emulsion of fat, milk solids and sugar with minor amounts of flavourings, stabilisers and colours. Depending on its temperature and composition, the ice cream may be substantially solid or plastic, the latter being known as a soft-serve ice cream. This type of product is usually prepared at the point of sale, in a freezer which basically consists of a cooled reservoir provided with an efficient stirrer. The liquid mix is poured into this reservoir and is cooled with stirring until it has frozen to the desired consistency. A "hard" ice cream is prepared in similar manner, but the soft product is subsequently hardened by further freezing.

An object of the present invention is to provide a non-dairy mix which on reconstitution with water and freezing yields an ice cream product of excellent flavour and texture.

A further object of this invention is to provide a process for preparing a dry mix which may be combined with water and frozen to give a high quality non-dairy ice cream product.

In accordance with the present invention, a powdered ice cream mix comprises, on a dry weight basis, 8–30% fat, 9–18% lactose, 15–27% corn syrup solids, 36–48% sugar, 1–4% sodium caseinate and minor amounts of emulsifier, stabiliser, flavourings and optionally colouring. The moisture content of the dry product is usually about 1.5% and would as a rule not exceed 2.0%.

Preferably the fat is a vegetable fat having a Wiley melting point of 32 to 46° C. Examples of such fats are coconut oil, palm kernel oil, peanut oil, cottonseed, sunflower, 50% soya bean-50% peanut and any vegetable fat suitable for mellorine type products. The flavourings, which may be natural or artificial, generally represent less than 2% of the dry weight of the mix. Any desired flavourings such as raspberry, strawberry, butter-malple, etc., may be used. In addition, the presence of a small quantity of salt in the mix has a favourable effect on the flavour. When a chocolate-flavoured product is desired, the dry mix may contain about 5–15% by weight of cocoa powder, which would replace a corresponding quantity of one or more of the carbohydrate ingredients.

The emulsifying agent is a mixture of sorbitan tristearate, commonly known as Tween 65, and sorbitan monooleate, commonly known as Tween 80.

To prepare the ice cream, it is preferred to combine about one part by weight of dry mix with about two parts by weight of water, so that a reconstituted product containing about 30–36% by weight of solids is obtained, Products with solids contents outside this range are less desirable from the point of view of texture and consistency. The mixture is then frozen in a conventional ice cream freezer, until a product having the plastic consistency of soft-serve ice cream is obtained, which is usually at a product temperature of about −5 to −7° C. The plastic product may then be packed in suitable containers and hardened by further freezing, for example to about −18° C. The powdered mix combines with water at ambient temperatures, but it may be desirable to use warm water, at about 35–40° C., in order to accelerate dispersion of the powder and to avoid any lumping tendencies. Higher water temperatures are unecessary, and even undesirable, since the warm mix would require a longer freezing time.

By providing dry mixes with different fat contents, it is possible to obtain any desired fat level in the reconstituted product. As the dry mix according to the invention is preferably reconstituted with suffifficient water to give a 30–36% solids level in the final product, dried products containing about 18% fat yield a 6% fat ice cream and those containing 9% fat give a 3% fat level in the reconstituted product.

In general, a 3–6% fat level is found in soft-serve ice cream products, whereas hard ice cream usually contains 10% of fat. In accordance with the present invention, the produced mix may containin up to 30% fat so that on reconstitution with two parts of water, an ice cream containing about 10% of fat is obtained.

As indicated, the powder mix according to the invention consists of two principal ingredients notably fat and carbohydrate material, this latter being made up of lactose, corn syrup solids and sugar. In addition, the mix may contain a minor amount, for example up to about 0.5%, of one or more emulsifiers, a stabiliser (generally about 1%) and flavourings, including salt. Natural or artificial colouring may also be added as desired.

The proportions of the carbohydrate ingredients in the mix will to a certain degree be dictated by the properties desired for the finished reconstituted product. Thus, the sugar level will be adjusted to give the required sweetness, whereas the proportion of lactose and corn syrup solids will normally be chosen in relation to the texture and consistency desired in the final product. Economic considerations may also influence the composition, in that lactose is usually more expensive than corn syrup solids. The carbohydrate ingredients may constitute 72–87% of the total weight of the mix, preferably including 39–46% of sugar, 13–16% of lactose and 16–23% of corn syrup solids.

Prepartion of the mix is preferably carried out in two stages, the first being the spray-drying of a liquid premix of fat, sodium caseinate and a proportion of the carbohydrate material together with an emulsifier, whereas the second stage involves dry blending of the dried material with the remaining ingredients in proper proportions. The solids content of the liquid pre-mix will usually be constituted on a weight basis of about 16–40% of fat and about 6% of sodium caseinate, the remainder being carbohydrate with a minor proportion, usually not exceeding 1% of one or more emulsifiers.

The carbohydrate material is preferably corn syrup solids with an addition of sugar and/or lactose. Desirably, the quantity of corn syrup solids represents between 32 and 46% of the weight of the dry matter in the liquid pre-mix. As an example the dry matter of the pre-mix may be made up as follows:

| | Percent |
|---|---|
| Fat | 16–40 |
| Lactose | 0–30 |
| Sodium caseinate | 3–7 |

| | Percent |
|---|---|
| Sugar | 0–10 |
| Corn syrup solids | 25–50 |
| Emulsifiers | 0.5–1.0 |

The ingredients are dispersed in water to provide a solution or suspension containing 40–60%, preferably about 50% total solids. The liquid mix is then homogenised, for example at a total pressure of 35 to 210 kg./cm.² Drying may desirably be preceded by a pasteurisation step, in which the liquid mix is held at a temperature of about 70° C. for about 30 minutes. The resulting powder is dry blended with appropriate quantities of the remaining ingredients (sugar, lactose, optionally corn syrup, stabiliser, salt, flavourings and colourings) to provide a dry ice cream mix having the desired fat level. Thus, to obtain a dry mix containing 18% of fat (which, on reconstitution with two parts of water, yields a 6% fat ice cream), 1.09 parts of the spray-dried material may be blended with 0.86 part of sugar, 0.02 part of stabiliser and minor amounts of salt and flavouring. The blended material would then have the following approximate composition:

| | Percent |
|---|---|
| Fat | 18.2 |
| Lactose | 14.2 |
| Sodium caseinate | 3.0 |
| Corn syrup solids | 18.2 |
| Sugar | 42.9 |
| Stabiliser | 1.0 |
| Emulsifier | 0.3 |
| Salt+flavourings | 2.2 |

When a mix containing about 9% of fat is desired, about one part of spray-dried material containing 36% fat and no sugar may be blended with three parts of a mixture of sugar, corn syrup, optionally lactose together with the stabiliser and flavours.

Alternatively, a spray-dried material of lower fat content, for example 18%, may be prepared which, on addition of two parts of water, provides a reconstituted ice cream product containing about 3% of fat. The decrease in the fat level of the spray-dried material may be compensated by a corresponding increase in the quantities of the carbohydrate ingredients, principally corn syrup solids, it generally being preferred to maintain the sugar level within the range 39–48%.

From the foregoing, it will be seen that the composition of the final mix and notably its content of fat, sugar, lactose and corn syrup may be adjusted at two different stages of the preparation process. For example, a spray-dried material containing no sugar may be dry blended with an appropriate quantity of this ingredient to provide the desired level in the finished product. Likewise, a spray-dried material containing up to 40% of fat may be suitably "diluted" with lactose and/or corn syrup solids to lower the fat content to 30%. Furthermore, in the preparation of chocolate-flavoured mixes, the cocoa may be incorporated in the liquid pre-mix or be blended with the spray-dried base powder. Specific preferred compositions and their methods of preparation will be found in the examples.

The powdered mix according to the invention may also be used in the preparation of liquid products similar to milk shakes. In this case, the powder is reconstituted with the same quantity of water as that used in the preparation of ice cream. Thereafter it may be frozen to about −2° C. and whipped or it may be frozen to about −6 to −7° C., diluted with skimmed milk and whipped as before.

Reconstituted products prepared from a dry mix according to the invention have excellent flavour, consistency and texture and are practically indistinguishable from similar products composed of dairy ingredients. A particular advantage of the dry mix is that it has good storage stability, whereas the liquid mixes currently used are required to be consumed within a short time after manufacture.

The following examples, in which all parts are by weight unless stated otherwise, are intended to further illustrate the invention without, however, limiting its scope.

EXAMPLE 1

A dry blend of 6 parts lactose, 3 parts sodium caseinate and 4.5 parts sugar is prepared and added to 45.5 parts of water warmed to 60° C. in a steam-jacketed kettle provided with a stirrer. 18.0 parts of molten coconut oil (Wiley melting point 33.4° C.) are mixed with the solution, followed by 0.3 part of emulsifiers (0.15 part melted Tween 65 and 0.15 part of Tween 80). 22.6 parts of corn syrup (80% solids) are then added and the temperature is raised to about 73° C. The liquid mix is homogenised at this temperature in two stages, at about 175 kg./cm.² in the first stage and 35 kg./cm.² in the second. The homogenised mix is spray-dried under the following conditions:

| | | |
|---|---|---|
| Liquid pressure | kg./cm.² | 32 |
| Liquid temperature | ° C. | 65 |
| Inlet air temperature | ° C. | 180 |
| Outlet air temperature | ° C. | 88 |

45 parts of dry powder are obtained, containing 1.28% of moisture.

740.5 parts of spray dried base powder are then mixed with the following ingredients:

| | Parts |
|---|---|
| Sugar | 592.6 |
| Lactose | 130.0 |
| Carrageenan | 15.0 |
| Salt | 10.0 |
| Imitation vanilla flavour | 6.9 |
| Imitation butter maple-vanilla flavour | 3.1 |
| Certified yellow food colour | 0.1 | to provide a dry ice cream mix having the following percentage composition:

| | Percent |
|---|---|
| Sugar | 44.0 |
| Fat | 17.9 |
| Corn syrup solids | 17.9 |
| Lactose | 14.6 |
| Sodium caseinate | 2.9 |
| Carageenan | 1.0 |
| Salt | 0.7 |
| Flavourings | 0.7 |
| Emulsifiers | 0.3 |
| Colouring | Trace |

33 parts of the mix are dispersed in 67 parts of water at 32 to 38° C. with mechanical agitation. The liquid is then poured into the freezing compartment of a soft-serve ice cream freezer and frozen to a temperature of about −7° C. in 10 to 12 minutes.

The frozen product is then drawn off as a soft-serve ice cream. It has a very good flavour and texture; the overrun is 44%.

EXAMPLE 2

6.6 parts of lactose, 3.3 parts of sodium caseinate and 5.1 parts of sugar are dry blended and the mixture is added to 43.8 parts of water warmed to about 60° C. in a jacketed kettle. Thereafter, 9.9 parts of molten coconut oil (Wiley melting point 33.4° C.), 0.3 part of emulsifier (0.15 part Tween 65, molten, and 0.15 part Tween 80) and 31 parts of corn syrup (80% solids) are then added, the mixture is heated to 73° C., homogenised at 210 kg./cm.$^2$ total pressure and spray-dried under the following conditions:

| | |
|---|---|
| Liquid pressure _____kg./cm.$^2$__ | 35 |
| Liquid temperature _____°C__ | 60 |
| Inlet air temperature _____°C__ | 177 |
| Outlet air temperature _____°C__ | 85 | to provide 49 parts of base powder.

A blend of the following ingredients is then prepared:

| | Parts |
|---|---|
| Base powder _____ | 687.8 |
| Sugar _____ | 640.3 |
| Lactose _____ | 136.2 |
| Carrageenan _____ | 15.0 |
| Salt _____ | 10.0 |
| Artificial vanilla and butter-maple flavours _____ | 10.0 |
| Colouring (yellow) _____ | 0.1 | to give an ice cream powder having the following approximate composition:

| | Percent |
|---|---|
| Sugar _____ | 47.4 |
| Corn syrup solids _____ | 22.7 |
| Lactose _____ | 15.1 |
| Fat _____ | 9.1 |
| Sodium caseinate _____ | 3.0 |
| Carrageenan _____ | 1.0 |
| Salt _____ | 0.67 |
| Flavourings _____ | 0.67 |
| Emulsifier _____ | 0.30 |
| Colouring _____ | Trace |

One part of the ice cream powder is combined with two parts of water and frozen as described in Example 1. The resulting soft-serve ice cream has a very good texture and flavour; an overrun of 42% is obtained.

EXAMPLE 3

A dry blend is prepared from the following ingredients:

| | Parts |
|---|---|
| Spray-dried base powder prepared according to Example 1 _____ | 370.3 |
| Sugar _____ | 640.0 |
| Corn syrup solids _____ | 264.2 |
| Lactose _____ | 174.6 |
| Flavouring (imitation vanilla+butter maple) ____ | 24.0 |
| Carrageenan _____ | 15.0 |
| Salt _____ | 10.0 |
| Colouring _____ | 0.1 | to give an ice cream mix powder having the following composition:

| | Percent |
|---|---|
| Sugar _____ | 44.9 |
| Corn syrup solids _____ | 26.6 |
| Lactose _____ | 14.6 |
| Fat _____ | 8.9 |
| Flavourings _____ | 1.6 |
| Codium caseinate _____ | 1.5 |
| Stabiliser (carrageenan) _____ | 1.0 |
| Salt _____ | 0.67 |
| Emulsifier _____ | 0.15 |
| Colouring _____ | Trace |

This mix (1 part) is combined with water (2 parts) and frozen in an ice cream freezer. The frozen product, drawn off as a soft-serve ice cream, has good flavour and texture.

The vanilla/butter maple flavouring may be replaced by an equivalent quantity of raspberry or strawberry essence, if desired diluted with a filter (lactose or corn syrup solids), together with an appropriate red colouring.

EXAMPLE 4

13.8 parts of lactose are mixed with 2.8 parts of sodium caseinate and the blend is added to 45.9 parts of water warmed to 60° C. Thereafter, 16.6 parts of fat (coconut oil, M.P. 33.4° C.), 0.28 part of emulsifiers and 20.7 parts of corn syrup (80% solids) are added, the water temperature is raised to 74° C. and the mixture is homogenised in two stages, at 175 kg./cm.$^2$ in the first and 35 kg./cm.$^2$ in the second. The homogenised mix is then spray-dried under the following conditions:

| | |
|---|---|
| Liquid pressure _____kg./cm.$^2$__ | 31.4 |
| Liquid temperature _____°C__ | 55 |
| Inlet air temperature _____°C__ | 188 |
| Outlet air temperature _____°C__ | 79 |

49 parts of spray-dried base mix powder are thus obtained:

A blend of the following ingredients is then prepared:

| | Parts |
|---|---|
| Base mix powder _____ | 809.4 |
| Sugar _____ | 639.7 |
| Flavouring (vanilla+butter maple) _____ | 24.0 |
| Stabiliser (carrageenan) _____ | 15.0 |
| Salt _____ | 10.0 |
| Colouring _____ | 0.1 |

The blended material has the following approximate composition:

| | Percent |
|---|---|
| Sugar _____ | 42.7 |
| Fat _____ | 17.9 |
| Corn syrup solids _____ | 17.9 |
| Lactose _____ | 14.9 |
| Sodium caseinate _____ | 2.98 |
| Flavourings _____ | 1.6 |
| Stabiliser _____ | 1.0 |
| Emulsifiers _____ | 0.3 |
| Salt _____ | 0.67 |
| Colouring _____ | Trace |

One part of this blend is reconstituted with 2 parts of water and the mixture frozen in about 10 minutes to −7° C. A soft-serve ice cream product having good texture and flavour is thus obtained.

EXAMPLE 5

A dry blend of the following ingredients is prepared:

| | Parts |
|---|---|
| Spray-dried base powder prepared according to Example 1 _____ | 740.5 |
| Sugar _____ | 638.0 |
| Lactose _____ | 130.0 |
| Cocoa (18% fat) _____ | 100.0 |
| Stabiliser (carrageenan) _____ | 15.0 |
| Salt _____ | 10.0 |
| Sodium citrate _____ | 4.5 | to provide chocolate-flavoured ice cream mix having the following approximate composition:

| | Percent |
|---|---|
| Sugar _____ | 43.0 |
| Corn syrup solids _____ | 16.3 |
| Fat _____ | 16.3 |
| Lactose _____ | 13.4 |
| Cocoa (incl. cocoa fat) _____ | 6.1 |
| Sodium caseinate _____ | 2.7 |
| Stabiliser _____ | 0.9 |
| Salt _____ | 0.6 |
| Emulsifiers _____ | 0.3 |
| Sodium citrate _____ | 0.3 |

One part of the mix, reconstituted with two parts of water and frozen as previously described, provides an excellent chocolate flavoured soft-serve ice cream product.

EXAMPLE 6

A dry mix of 5.8 parts lactose, 2.9 parts sodium caseinate, 4.5 parts sugar and 6.3 cocoa is added to 44.6 parts of water warmed to 60° C. Thereafter, 8.6 parts of fat (coconut oil, M.P. 33.4° C.), 0.29 part of emulsifiers and 27.0 parts of corn syrup (80% solids) are added, the water temperature is raised to 74° C. and the mixture is homogenised in two stages (175 kg./cm.² first stage, 35 kg./cm.² second).

The homogenised mixture is then spray-dried under the following conditions:

| | |
|---|---:|
| Liquid pressure _____kg./cm.²__ | 32 |
| Liquid temperature _____° C__ | 74 |
| Inlet air temperature _____° C__ | 190 |
| Outlet air temperature _____° C__ | 80 |

49 parts of spray-dried base mix powder are thus obtained.

A blend of the following ingredients is then prepared:

| | Parts |
|---|---:|
| Base mix powder _____ | 787.7 |
| Sugar _____ | 630.7 |
| Lactose _____ | 100.0 |
| Stabiliser (carrageenan) _____ | 15.0 |
| Salt _____ | 10.0 |
| Sodium citrate _____ | 4.5 |

The blended material has the following approximate composition:

| | Percent |
|---|---:|
| Sugar _____ | 45.3 |
| Corn syrup solids _____ | 22.0 |
| Lactose _____ | 12.3 |
| Fat _____ | 8.8 |
| Cocoa _____ | 6.5 |
| Sodium caseinate _____ | 2.9 |
| Stabiliser _____ | 1.0 |
| Salt _____ | 0.6 |
| Emulsifiers _____ | 0.3 |
| Sodium citrate _____ | 0.3 |

One part of the blended material is reconstituted with two parts of water and the mixture frozen in about 10 minutes to −7° C. An excellent soft-serve chocolate flavoured ice cream having good texture and flavour is then obtained.

EXAMPLE 7

A dry mix of the following ingredients is prepared:

| | Parts |
|---|---:|
| Spray-dried base mix powder prepared according to Example 1 _____ | 370.3 |
| Sugar _____ | 640.0 |
| Corn syrup solids _____ | 248.5 |
| Lactose _____ | 110.0 |
| Cocoa _____ | 100.0 |
| Stabiliser _____ | 15.0 |
| Salt _____ | 10.0 |
| Sodium citrate _____ | 4.5 | giving a powder having the following composition:

| | Percent |
|---|---:|
| Sugar _____ | 45.0 |
| Corn syrup solids _____ | 25.5 |
| Lactose _____ | 10.3 |
| Fat _____ | 8.9 |
| Cocoa _____ | 6.7 |
| Sodium caseinate _____ | 1.5 |
| Stabiliser _____ | 1.0 |
| Emulsifiers _____ | 0.15 |
| Salt _____ | 0.7 |
| Sodium citrate _____ | 0.3 |

This powdered mix is reconstituted as described in the preceding example to provide a chocolate flavoured ice cream.

EXAMPLE 8

A dry blend of 6.0 parts lactose, 3.0 parts sodium caseinate and 4.5 parts sugar is prepared and added to 45.5 parts of water warmed to 60° C., 18.1 parts of molten coconut oil (M.P. 42.8° C.), 0.24 part of emulsifiers (mixture of equal parts of Tween 65 and 80), 0.06 part lecithin and 22.6 parts of corn syrup (80% solids) are then added and the water temperature is raised to about 70° C. The mixture is then homogenised in two stages (175 kg./cm.² first stage, 35 kg./cm.² second) and spray-dried under the following conditions:

| | |
|---|---:|
| Liquid pressure _____kg./cm.²__ | 32 |
| Liquid temperature _____° C__ | 54 |
| Inlet air temperature _____° C__ | 190 |
| Outlet air temperature _____° C__ | 80 |

49 parts of dry powder are thus obtained.

A blend of the following ingredients is then prepared:

| | Parts |
|---|---:|
| Spray-dried powder _____ | 740.5 |
| Sugar _____ | 592.6 |
| Lactose _____ | 116.0 |
| Flavourings (imitation vanilla+butter maple) ___ | 24.0 |
| Stabiliser _____ | 15.0 |
| Salt _____ | 10.0 |
| Colouring _____ | 0.1 | to provide an ice cream mix of the following composition:

| | Percent |
|---|---:|
| Sugar _____ | 44.0 |
| Fat _____ | 17.9 |
| Corn syrup solids _____ | 17.9 |
| Lactose _____ | 13.7 |
| Sodium caseinate _____ | 3.0 |
| Flavourings _____ | 1.6 |
| Stabiliser _____ | 1.0 |
| Salt _____ | 0.67 |
| Emulsifiers _____ | 0.24 |
| Lecithin _____ | 0.06 |
| Colouring _____ | Trace |

One part of the mix is reconstituted with two parts of water and frozen to about −7° C. in a soft-serve ice cream freezer.

EXAMPLE 9

12.9 parts of lactose, 19.6 parts of corn syrup (80% solids), 3.9 parts of sugar and 2.6 parts of sodium caseinate are mixed together and added to 46.3 parts of water at 60° C. Thereafter, 14.4 parts of coconut oil (M.P. 32.8° C.) and 0.3 part of emulsifiers (1:1 mixture of Tween 65 and Tween 80) are added, the temperature is raised to about 72° C. and the mixture is homogenised in two stages (175 kg./cm.² first stage, 35 kg./cm.² second). The homogenised mix is then spray-dried under the following conditions:

| | |
|---|---:|
| Liquid pressure _____kg./cm.²__ | 32 |
| Liquid temperature _____° C__ | 63 |
| Inlet air temperature _____° C__ | 180 |
| Outlet air temperature _____° C__ | 80 |

The resulting powder is then dry blended with other ingredients as follows:

| | Parts |
|---|---:|
| Spray-dried powder _____ | 867.1 |
| Sugar _____ | 582.0 |
| Flavourings (imitation vanilla and butter-maple) _____ | 24.0 |
| Stabiliser _____ | 15.0 |
| Salt _____ | 10.0 |
| Colouring _____ | 0.1 | to provide an ice cream mix having the following composition:

| | Percent |
|---|---:|
| Sugar _____ | 43.4 |
| Corn syrup solids _____ | 18.2 |
| Fat _____ | 16.7 |
| Lactose _____ | 15.2 |
| Sodium caseinate _____ | 3.0 |
| Flavouring _____ | 1.6 |
| Stabiliser _____ | 1.0 |
| Salt _____ | 0.7 |
| Emulsifier _____ | 0.3 |
| Colouring _____ | Trace |

One part of the mix was reconstituted with two parts of water and frozen in 12 minutes to a temperature of about −7° C., with an overrun of 41%. The frozen product has a good colour, flavour and texture.

EXAMPLE 10

A spray mix composed of:

| | Parts |
|---|---|
| Water | 46.3 |
| Corn syrup (80% solids) | 19.1 |
| Coconut oil (M.P. 36–38° C.) | 15.3 |
| Lactose | 12.8 |
| Sodium caseinate | 2.6 |
| Sugar | 3.8 |
| Emulsifiers | 0.13 | is warmed to about 75° C., homogenised in one stage at 35 kg./cm.$^2$ and spray-dried under the following conditions:

| | |
|---|---|
| Liquid pressure kg./cm.$^2$ | 32 |
| Liquid temperature ° C. | 63 |
| Inlet air temperature ° C. | 199 |
| Outlet air temperature ° C. | 79 |

The resulting powder is then mixed with the remaining ingredients in the following proportions:

| | Parts |
|---|---|
| Base powder | 889.8 |
| Sugar | 559.2 |
| Flavourings (vanilla+butter-maple) | 24.0 |
| Stabiliser | 15.0 |
| Salt | 10.0 |
| Colouring | 0.1 | to provide an ice cream mix having the following approximate composition:

| | Percent |
|---|---|
| Sugar | 41.9 |
| Fat | 18.2 |
| Corn syrup solids | 18.2 |
| Lactose | 15.1 |
| Sodium caseinate | 3.0 |
| Colouring+flavouring | 1.6 |
| Stabiliser | 1.0 |
| Salt | 0.7 |
| Emulsifiers | 0.3 |

On reconstitution with water and freezing, the mix yields a vanilla-flavoured ice cream having a pleasant taste and texture.

EXAMPLE 11

A spray-mix composed of 3.1 parts sodium caseinate, 6.2 parts of sugar, 18.6 parts of coconut oil (M.P. 36–38° C.), 27.2 parts of corn syrup (80% solids), 0.3 part of emulsifiers, and 44.5 parts of water is heated to 72° C., homogenised in two stages at a total pressure of 210 kg./cm.$^2$ and spray-dried.

730.9 parts of spray-dried powder are then dry blended with 493.4 parts of sugar, 224.7 parts of lactose, 15.0 parts of carrageenan, 10.0 parts of salt, 24.0 parts of imitation vanilla/butter-maple flavouring and 0.1 part of certified yellow food colour to provide an ice cream mix having the following approximate composition:

| | Percent |
|---|---|
| Sugar | 39.0 |
| Corn syrup solids | 21.2 |
| Fat | 18.2 |
| Lactose | 15.0 |
| Sodium caseinate | 3.0 |
| Flavourings | 1.6 |
| Stabiliser | 1.0 |
| Salt | 0.7 |
| Emulsifiers | 0.3 |
| Colouring | Trace |

EXAMPLE 12

A dry blend is prepared from:

| | Parts |
|---|---|
| Spray-dried base mix prepared according to Example 4 | 410.9 |
| Sugar | 650.0 |
| Corn syrup solids | 238.2 |
| Lactose | 150.0 |
| Flavouring (imitation vanilla/butter-maple) | 24.0 |
| Stabiliser | 15.0 |
| Salt | 10.0 |
| Colouring | 0.1 | giving a vanilla-flavoured ice cream mix composed of:

| | Percent |
|---|---|
| Sugar | 43.4 |
| Corn syrup solids | 25.0 |
| Lactose | 17.6 |
| Fat | 9.1 |
| Flavouring | 1.6 |
| Sodium caseinate | 1.5 |
| Stabiliser | 1.0 |
| Salt | 0.7 |
| Emulsifiers | 0.15 |
| Colouring | Trace |

One part of the mix is reconstituted with 2 parts of water and frozen to soft-serve consistency with an overrun of 43.6%.

EXAMPLE 13

A spray-dried base powder is prepared as described in Example 1, except that the drying conditions are:

| | |
|---|---|
| Liquid pressure kg./cm.$^2$ | 31.6 |
| Liquid temperature ° C. | 60 |
| Inlet air temperature ° C. | 188 |
| Outlet air temperature ° C. | 74 |

The resulting base powder is then dry blended with the other ingredients in the proportions stated in Example 7.

We claim:

1. A process for preparing a powdered non-dairy ice cream mix which comprises forming an aqueous pre-mix containing 40 to 60% by weight of solids, said solids being composed of 16–40% of a vegetable fat having a Wiley melting point of 32 to 46° C., 0–30% of lactose, 0–10% of sugar, 25–50% of corn syrup solids, 3–7% of sodium caseinate and 0.5–1.0% of a mixture of sorbitan tristearate and sorbitan monooleate emulsifiers, homogenising said pre-mix, spray-drying the homogenised pre-mix to obtain a spray-dried base powder, and then blending the base powder with a sufficient quantity of at least one member of the group consisting of sugar, lactose and corn syrup solids, together with a minor amount of a stabiliser and a flavouring, to provide an ice cream mix composed, on a dry weight basis, of 8–30% of vegetable fat, 9–18% of lactose, 15–27% of corn syrup solids, 36–48% of sugar 1 to 4% of sodium caseinate and minor amounts of sorbitan tristearate and sorbitan monooleate emulsifiers, a stabiliser and a flavouring.

2. A process according to claim 1 in which said premix also contains cocoa powder in an amount corresponding to 10 to 30% by weight of the solids.

3. A process according to claim 1 in which the base powder is also blended with a sufficient quantity of cocoa powder to provide an ice cream mix also containing 5 to 15% by weight of cocoa.

4. A process according to claim 1 in which the premix is homogenised at a total pressure of 35 to 210 kg./cm.² and introduced into a spray-drying zone held at an air inlet temperature of about 180° to about 200° C. and an outlet air temperature of about 74° to 88° C.

References Cited

UNITED STATES PATENTS

| | | | |
|---|---|---|---|
| 2,619,422 | 11/1952 | Diamond | 99—136 |
| 2,633,424 | 3/1953 | Otting et al. | 99—136 |
| 3,183,098 | 5/1965 | Baur | 99—136 |
| 3,357,840 | 12/1967 | Fisher | 99—136 |

OTHER REFERENCES

Frandsen, Ice Cream and Related Products, Avi Pub. Co., Westport, Conn., 1961, pp. 75–78.

RAYMOND N. JONES, Primary Examiner

J. M. HUNTER, Assistant Examiner